United States Patent [19]

Angermaier et al.

[11] Patent Number: 5,377,536
[45] Date of Patent: Jan. 3, 1995

[54] METHOD FOR IDENTIFYING MISFIRE IN INTERNAL COMBUSTION ENGINES

[75] Inventors: Anton Angermaier, Landshut; Thomas Vogt, Regensburg; Manfred Wier, Wenzenbach, all of Germany

[73] Assignee: Siemens Aktiengesellschaft, Munich, Germany

[21] Appl. No.: 107,217

[22] Filed: Aug. 16, 1993

[30] Foreign Application Priority Data

Aug. 14, 1992 [XH] Hague Agreement ............ 92113917

[51] Int. Cl.⁶ ............................................. G01M 15/00
[52] U.S. Cl. ..................................... 73/116; 123/436
[58] Field of Search ............... 73/117.3; 123/436, 481; 364/431.03, 431.07

[56] References Cited

U.S. PATENT DOCUMENTS

| | | | |
|---|---|---|---|
| 4,522,179 | 6/1985 | Nishimura et al. | 123/481 |
| 5,041,980 | 8/1991 | Maddock et al. | 364/431.07 |
| 5,113,830 | 5/1992 | Haines | 123/436 |
| 5,117,681 | 6/1992 | Dodsall et al. | 73/116 |
| 5,226,390 | 7/1993 | Nakagawa | 123/436 |
| 5,237,504 | 8/1993 | Holmes et al. | 364/431.08 |
| 5,237,862 | 8/1993 | Mangrulkar et al. | 73/116 |
| 5,255,560 | 10/1993 | Klenk et al. | 364/431.07 |
| 5,263,453 | 11/1993 | Wakahara et al. | 73/117.3 |
| 5,265,575 | 11/1993 | Norota | 123/436 |

FOREIGN PATENT DOCUMENTS

| | | |
|---|---|---|
| 4138765 | 7/1992 | Germany. |
| 0213921 | 8/1990 | Japan. |
| 0233627 | 9/1990 | Japan. |

*Primary Examiner*—Hezron E. Williams
*Assistant Examiner*—James M. Olsen
*Attorney, Agent, or Firm*—Herbert L. Lerner; Laurence A. Greenberg

[57] ABSTRACT

A method for identifying misfiring is employed in an internal combustion engine with multiple cylinders. The identification is effected by measuring segment times required for the crankshaft to rotate about given angular segments during the cylinder work cycle. Any fluctuations are then calculated and compared with threshold values. During thrust cutoff, i.e. when no fuel is supplied to the cylinders, errors in the segment time measurement are identified and corrected, and in dependence of the number of the completed cycles for calculating the correction factors, the threshold values are modified.

10 Claims, 1 Drawing Sheet

METHOD FOR IDENTIFYING MISFIRE IN INTERNAL COMBUSTION ENGINES

BACKGROUND OF THE INVENTION

Field of the Invention

The invention relates to a method for identifying erratic combustion in multicylinder internal combustion engines, i.e. misfire in cylinders, wherein the angular speed of the crankshaft is measured and which permits dependable recognition of misfirings, even in case of errors in the measurement of the crank angle speed.

In engines equipped with a catalytic converter, misfiring can lead to damage to the converter because high temperatures occur in the catalytic converter due to the secondary reaction of the unburned fuel-air mixture. The quality of waste gas is worsened by misfiring, regardless of whether or not a catalytic converter is used.

Various methods are known in which the instantaneous crank angle speed of the crankshaft is measured for identifying misfiring. A misfiring cylinder causes a temporary slowing of the angular speed of the crankshaft. To identify this, the periods of time (segment times) are measured during which the crankshaft rotates about a defined angular span. Such time measurement is conventionally done with markings on the crankshaft or a shaft connected to the crankshaft, or with a wheel mounted on these shafts. The markings or the wheel are scanned with sensors suited for this purpose.

The measured segment times are not used directly. Rather, so-called fluctuation values in the rotational speed are calculated from them, and various dynamic influences occurring during operation of the engine (acceleration, deceleration) can be compensated, depending on the method employed. A method of this type is described in European Patent Application 92111078.9, for example.

The fluctuation values are then compared with predetermined threshold values and, when the fluctuation values are below these threshold values (provided that a method is used in which a negative fluctuation value results from a misfire), or when the fluctuation valises exceed these threshold values (provided that a method is used in which a positive fluctuation value results from a misfire), misfiring is identified. If need be, control provisions can then be taken, such as turning off the applicable injection nozzle.

These methods can only function properly without errors when no errors occur during a measurement of the segment times.

These errors can stem from varying segment sizes, inaccuracies in tooth shape, disk backlash and errors in the sensors, for example.

If a marked segment is larger than the adjacent segment, for example, a slowing of the crankshaft is mimicked and misfiring is falsely identified.

SUMMARY OF THE INVENTION

It is accordingly an object of the invention to provide a method for identifying misfirings, which overcomes the hereinafore-mentioned disadvantages of the heretofore-known methods of this general type and which permits a reliable identification of misfiring and errors and avoidance of erroneous identifications, in spite of possible errors in the measurement of the segment times.

With the foregoing and other objects in view there is provided, in accordance with the invention, a method for identifying misfiring in an internal combustion engine having a plurality of cylinders, a crankshaft and markings defining segments indicating an angle of rotation of the crankshaft, which comprises:

measuring segment times required by the crankshaft to rotate about a predetermined angular span during a working cycle of respective ones of the cylinders determining whether or not the engine is in a thrust cutoff operating state during which a fuel supply is cut off and if the engine is in the thrust cutoff operating state, comparing the segment times obtained in the measuring step with a reference segment time of a reference segment, determining differences between the individual segment times and calculating a correction value for the respective segments associated with respective ones of the cylinders;

if the engine is not in the thrust cutoff operating state, determining a fluctuation from the measured and corrected segment times, and comparing the fluctuation with a fluctuation threshold value;

identifying misfire of a cylinder if the fluctuation is less than the threshold value for a case in which the calculated fluctuation values are negative when misfiring occurs or identifying misfire of a cylinder if the fluctuation is greater than the threshold value for a case in which the calculated fluctuation values are positive when misfiring occurs, and if the calculated fluctuation values are negative when misfiring occurs, taking the threshold value at a relatively small value during initial engine operation prior to calculating the correction values and increasing the threshold value to a relatively greater value with successive calculations of correction values; and if the calculated fluctuation values are positive when misfiring occurs, taking the threshold value at a relatively greater value during initial engine operation prior to calculating the correction values and decreasing the threshold value to a relatively smaller value with successive calculations of the correction values.

In identifying and correcting errors in measurement of the segment times, the method of the invention compares the measured segment sizes with a reference segment, recognizes differences and calculates correction values. This is done only when the engine is in an operating state that does not permit identification of misfiring, such as thrust cutoff, i.e. when the fuel supply is cut off. Such a method is described in applicants' European patent application No. 92 11 3916.8, filed Aug. 14, 1992, corresponding to copending U.S. patent application Ser. No. 08/107,216, which is herein incorporated by reference.

In accordance with another feature of the invention, the threshold value for the fluctuation is increased or decreased linearly. In a preferred embodiment, a linearity factor is used for increasing or decreasing the threshold value linearly and the linearity factor is chosen in dependence on a time in which the successively calculated correction factors approach a correction factor threshold value.

In accordance with again another feature of the invention, the method comprises approaching the correction factor threshold value of the successively calculated correction factors in accordance with a given function, and increasing or decreasing the threshold values of the fluctuation according to the given function.

In accordance with a further feature of the invention, the method comprises averaging the calculated correction values in accordance with an equation $$KM_n = KM_{n-1}*(1-MITKO) + K_n*MITKO,$$

where $KM_n$ is the averaged correction value, n is a dummy variable (n−1 is a previously averaged correction value), and MITKO is an averaging constant between 0 and 1, and decreasing or increasing the threshold values of the fluctuation as a function of a number of executed cycles required for calculating the correction factors in accordance with an equation $$MLUG_n = LUG_n - (\Delta\alpha/\alpha * TG_n * F)*(BS-ZZ)/BS,$$

where $\Delta\alpha/\alpha$ represents a maximum error in segment time measurement;

F represents a factor dependent on a method used in calculating the fluctuation;

$MLUG_n$ represents a modified threshold of the fluctuation;

$LUG_n$ represents a threshold of the fluctuation taken from a performance graph;

ZZ represents a number of cycles executed for calculating the correction factors:

BS represents a predetermined required number of cycles for correcting the segment errors with a predetermined residual error (G), wherein BS is calculated according to an equation BS= −ln(G)/MITKO, and wherein the threshold values are increased or decreased only as long as ZZ<BS.

Successive correction values are continuously calculated for the individual crankshaft segments associated with the cylinders and they are then subjected to averaging, preferably in the form of a sliding averaging, for example.

An averaging is quite important because the systematic errors of the segments can be superimposed on coincidental errors like tolerances with the switching inaccuracies of the sensors, or general oscillations or interference originating from the drive train or the power train.

With repeated calculations, these correction values for individual cylinders approach a threshold value. In theory, it is only possible to correct errors completely once this limit value has been reached. In practice, however, it is understood that sufficient error correction is effected with attainment of 95% of this threshold value, for example.

In accordance with again a further feature of the invention, the method comprises storing the number of completed cycles for calculating the correction factors and the number of cycles required for correcting the segment error with the predetermined residual error in a non-volatile memory and using the stored values as starting values during a start of a subsequent engine operation.

In accordance with a concomitant feature of the invention, the method comprises averaging the continuously calculated correction values and weighting newly calculated correction values relatively strongly at a beginning of calculation of the correction values, and weighting newly calculated correction values relatively weakly with an increasing number of calculations.

To speed up the approach toward the limit value, an averaging can be used at the start of the correction value calculations with which the newly-calculated values are given strong consideration. This is referred to as strongly weighting. With a rising number of cycles for calculating the correction values, different averaging can be used in which the newly-calculated values are more weakly considered. The advantage of: the latter is that coincidental errors are also more weakly considered.

The threshold values of the fluctuation are adapted to correspond to the approach of the adjusting values toward this limit value. In order to exclude faulty identification, at the start of calculation of the adjusting values, when the adjusting value is still faulty, the threshold value of the fluctuation is set at a low value, provided that a method is used with which a negative fluctuation results with misfiring (the threshold is set to a high value with a method in which a positive fluctuation results with misfiring).

With increasing improvement of the accuracy of the correction values, the threshold value is then correspondingly raised or lowered to a normal value.

These normal values are advantageously stored in performance graphs or data fields, depending on the function of operation variables, for the case of error-free segment measurement.

During the very first operation of the engine, the number of required cycles for calculating the correction values is calculated as a function of the averaging constant(s) used, after completion of which the correction values correct the errors in segment time measurement with the desired accuracy (up to 95%, for example).

Furthermore, the cycle counter and the correction values are initialized with predeterminable values, preferably zero.

Other features and method steps which are considered as characteristic for the invention are set forth in the appended claims.

Although the invention is illustrated and described herein as embodied in a method for identifying misfirings, it is nevertheless not intended to be limited to the details shown, since various modifications may be made therein without departing from the spirit of the invention and within the scope and range of equivalents of the claims.

The invention, however, together with additional objects and advantages thereof will be best understood from the following description of a specific embodiment when read in connection with the accompanying drawing.

DESCRIPTION OF THE PREFERRED EMBODIMENTS

Figure 1:
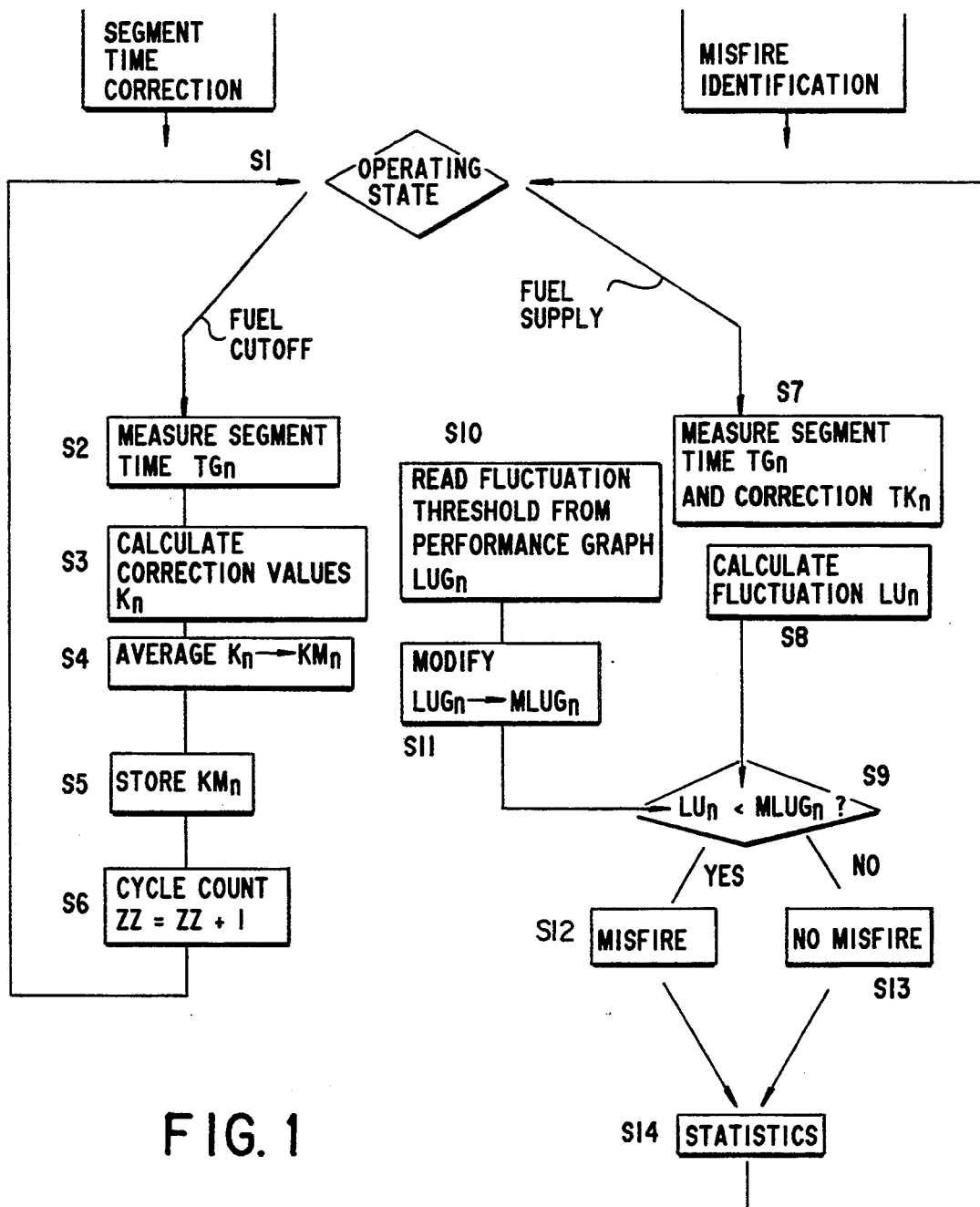
FIG. 1 is a dual branched flow chart illustrating the method according to the invention.

Referring now to the single figure of the drawing in detail, it is noted that the following description is based on the presumption that the calculated fluctuation values are negative when misfiring occurs.

At the start of the very first engine operation, the cycle counter and the correction values for the segments are initialized with values that can be preset. In the exemplary embodiment the initialization is a reset to zero. With every further start of operation, the values established and stored during a preceding operation are used as starting values.

In method step S1, a preliminary check establishes the operating state in which the engine is at the time.

If the operating state is that of thrust cutoff, i.e. fuel supply is cut off, new correction values are calculated for the segments. For this purpose the segment times $TG_n$ of the segments associated with the respective cylinders are measured for all cylinders in method step S2. Through comparison with a reference segment, deviations in the segment times are identified, and correction values $K_n$ for the segments associated with individual cylinders are calculated from this in method step S3 in accordance with a method described in our above-mentioned, copending application. These correction values are subjected to an averaging calculation, such as a sliding averaging, in method step S4. The mean value $KM_n$ is calculated in accordance with the equation $$KM_n = KM_{n-1}*(1-MITKO) + K_n*MITKO,$$

where $KM_n$ is the averaged correction value, $K_n$ is the correction value that has not been averaged, and MITKO is an averaging constant with a value between 0 and 1. MITKO may also be referred to as a weighting constant. In other words, if its value is high then the term $K_n$ is weighted strongly in the mean value $KM_n$, while the expression (1−MITKO) becomes small, so that the previous mean value $KM_{n-1}$ is given weak consideration. The dummy index n is not the same as the index n which refers to the respective segments, so that an index switch to, say, m may be advantageous. For instance, the three-line conversion would then read m=n; $KM_m = KM_{m-1}*(1-MITKO) + K_n*MITKO$; n=m.

Coincidental errors that may be superimposed on the systematic segment errors are eliminated with the averaging.

The averaging constant MITKO depends on the number of previously calculated correction values, as described above. At the beginning, when only a few correction values $K_n$ have been calculated, i.e. only few cycles have been executed, the averaging constant MITKO is selected to be large, such as 0.2. Due to this, the correction value $K_n$ that is newly calculated at that time is given strong consideration in averaging. The averaged correction values thus approach the limit value $KG_n$ very rapidly. The system "learns" quickly of the segment errors, and can correct them accordingly. Unfortunately, however, any coincidental errors are also given strong consideration.

Therefore the averaging constant is later set at a lesser value, such as 0.02, after more cycles have been executed.

The lowering of the averaging constant MITKO in dependence on the number of correction values already calculated (the number being stored in a loop or cycle counter described below), may take place in several steps.

In method step S5 the previous correction values are overwritten and replaced with the newly averaged correction values.

In method step S6 a cycle counter or loop counter ZZ is advanced by 1.

The higher the value of the cycle counter, i.e. the greater the number of cycles that have already been executed, the better and more accurately the calculated correction values correct the established segment errors.

The status of the cycle counter is stored in a non-volatile memory, so that the value may be used as a starting value at the start of a new engine operation.

The left-hand branch of the method flow then loops back to method step S1, in which the current operating state of the engine is again determined.

If the engine is not in cutoff operation, i.e. fuel is being injected, the method proceeds with the righthand side of the flow chart (S7–S14). In other words, with combustion in the engine it is possible to identify misfiring.

For this, segment times $TG_n$ of the crankshaft are measured in method step S7 and corrected with the previously calculated correcting factor $KM_n$ ($TK_n$). From this, fluctuation values $LU_n$ for individual cylinders are determined in method step S8 in accordance with a method not described in detail here, with possible consideration of the dynamic engine behavior.

These fluctuation values are compared with modified threshold values $MLUG_n$ in method step S9.

With reference to step S10, the modified threshold values $MLUG_n$ are obtained in that threshold values $MLUG_n$ are taken from performance graphs or data matrices as a function of the current operating variables of the internal combustion engine. The threshold values are stored with the precondition that the time measurement of the segment time is free of errors.

The threshold values are then modified in method step S11 in accordance with the equation $$MLUG_n = LUG_n - (\Delta\alpha/\alpha * TG_n*F)*(BS-ZZ)/BS,$$

where $\Delta\alpha/\alpha$ represents the relative maximum error that can occur in a segment time measurement. In the case of a toothed tachometer wheel mounted on the crankshaft that is used in measuring, the error is a function of, among other things, the machining tolerance of the measuring wheel;

F represents a factor dependent on the method used to calculate the fluctuation values;

$MLUG_n$ represents the modified threshold value of the fluctuation;

$LUG_n$ represents the threshold value of the fluctuation taken from the performance graph;

ZZ represents the number of cycles executed up to that time for calculating the correction factors;

BS represents the number of cycles required to attain an approach toward the limit value of the correcting factor with which the segment errors are corrected by 95%, for example. BS is proportionally dependent on the inverse of the averaging constant used in calculating the correction values. BS is calculated in accordance with the equation BS = −ln(G)/MITKO, where G represents the residual error that the corrected segment times still have compared to the error-free segment times, in this case 0.05.

The modification of the threshold values is thus a function of the value of the cycle counter ZZ.

If the cycle counter ZZ has a starting value of zero, the threshold value is lowered to the value ($\Delta\alpha/\alpha*TG_n*F$). With an increasingly large number on the cycle counter ZZ, the modified threshold value $MLUG_n$ approaches, from below, the threshold value read out from the performance graph.

Modification is stopped when ZZ=BZ.

Afterward the threshold values from the performance graph are used directly for identifying misfiring.

If the fluctuation $LU_n$ is smaller in the comparison of the method step S9 than the modified threshold value $MLUG_n$, misfiring is identified (method step S12). In contrast, if it is larger than or equal to the modified threshold value $MLUG_n$, no misfiring is registered (method step S13).

With a method in which positive fluctuation values result with the occurrence of misfiring, the threshold values are naturally also positive and are modified to greater values in the initial phase. Erratic combustion is identified when these positive threshold values are exceeded.

The results from both sub-branches are supplied to a statistical evaluation device in method step S14, because with individually identified misfiring no control provisions are taken, such as turning off injection nozzles; instead, they are first taken when the statistical frequency of such misfiring exceeds a specific limit.

Subsequently the right-hand branch loops back to method step S1, in which the operating state of the engine is again determined.

We claim:

1. A method for identifying misfiring in an internal combustion engine having a plurality of cylinders, a crankshaft and markings indicating an angle of rotation of the crankshaft, which comprises:
    measuring segment times required by the crankshaft to rotate about a predetermined angular span during a working cycle of respective ones of the cylinders
    determining whether or not the engine is in a thrust cutoff operating state during which a fuel supply is cut off and
    if the engine is in the thrust cutoff operating state, comparing the segment times obtained in the measuring step with a reference segment time of a reference segment, determining differences between the individual segment times and calculating a correction value for the respective segments associated with respective ones of the cylinders;
    if the engine is not in the thrust cutoff operating state, determining a fluctuation from the measured and corrected segment times, and comparing the fluctuation with a fluctuation threshold value;
    identifying misfire of a cylinder if the fluctuation is less than the threshold value for a case in which the calculated fluctuation values are negative when misfiring occurs or identifying misfire of a cylinder if the fluctuation is greater than the threshold value for a case in which the calculated fluctuation values are positive when misfiring occurs, and
    if the calculated fluctuation values are negative when misfiring occurs, taking the threshold value at a relatively small value during initial engine operation prior to calculating the correction values and increasing the threshold value to a relatively greater value with successive calculations of correction values; and
    if the calculated fluctuation values are positive when misfiring occurs, taking the threshold value at a relatively greater value during initial engine operation prior to calculating the correction values and decreasing the threshold value to a relatively smaller value with successive calculations of the correction values.

2. The method according to claim 1, which comprises increasing the threshold value for the fluctuation linearly.

3. The method according to claim 2, which comprises increasing the threshold value linearly with a linearity factor and choosing the linearity factor in dependence on a time in which the successively calculated correction factors approach a correction factor threshold value.

4. The method according to claim 2, which comprises approaching the threshold value of the successively calculated correction factors in accordance with a given function, and increasing the threshold values of the fluctuation according to the given function.

5. The method according to claim 1, which comprises decreasing the threshold value for the fluctuation linearly.

6. The method according to claim 5, which comprises decreasing the threshold value linearly with a linearity factor and choosing the linearity factor in dependence on a time in which the successively calculated correction factors approach a correction factor threshold value.

7. The method according to claim 5, which comprises approaching the threshold value of the successively calculated correction factors in accordance with a given function, and decreasing the threshold values of the fluctuation according to the given function.

8. The method according to claim 1, which comprises averaging the calculated correction values in accordance with an equation $$KM_n = KM_{n-1}*(1-MITKO) + K_n * MITKO,$$

where $KM_n$ is the averaged correction value, n is a dummy variable, $n-1$ is a previously averaged correction value, and MITKO is an averaging constant between 0 and 1,
    and decreasing or increasing the threshold values of the fluctuation as a function of a number of executed cycles required for calculating the correction factors in accordance with an equation $$MLUG_n = LUG_n - (\Delta\alpha/\alpha * TG_n * F)*(BS-ZZ)/BS,$$

where
    $\Delta\alpha/\alpha$ represents a maximum error in segment time measurement;
    F represents a factor dependent on a method used in calculating the fluctuation;
    $MLUG_n$ represents a modified threshold of the fluctuation;
    $LUG_n$ represents a threshold of the fluctuation taken from a performance graph;
    ZZ represents a number of cycles executed for calculating the correction factors;
    BS represents a predetermined required number of cycles for correcting the segment errors with a predetermined residual error (G), wherein BS is calculated according to an equation $BS = -\ln(G)/MITKO$, and wherein the threshold values are increased or decreased only as long as $ZZ < BS$.

9. The method according to claim 8, which comprises storing the number of completed cycles for calculating the correction factors and the number of cycles required for correcting the segment error with the predetermined residual error in a non-volatile memory and using the stored values as starting values during a start of a subsequent engine operation.

10. The method according to claim 1, which comprises averaging the continuously calculated correction values and weighting newly calculated correction values relatively strongly at a beginning of calculation of the correction values, and weighting newly calculated correction values relatively weakly with an increasing number of calculations.

* * * * *